(12) United States Patent
Clampitt et al.

(10) Patent No.: US 6,514,916 B1
(45) Date of Patent: Feb. 4, 2003

(54) PROCESS FOR MAKING SULFONATED UINTAITE AND WELL FLUID ADDITIVES INCLUDING SULFONATED UINTAITE

(75) Inventors: Richard L. Clampitt, Bartlesville, OK (US); Billy L. Swanson, Bartlesville, OK (US)

(73) Assignee: R. L. Clampitt & Associates, Inc., Bartlesville, OK (US)

( * ) Notice: Subject to any disclaimer, the term of this patent is extended or adjusted under 35 U.S.C. 154(b) by 51 days.

(21) Appl. No.: 09/659,888

(22) Filed: Sep. 12, 2000

(51) Int. Cl.$^7$ .............................. C09K 7/02; C09K 7/06
(52) U.S. Cl. ..................... 507/107; 507/126; 507/207; 507/232; 507/904; 507/922; 175/72
(58) Field of Search ................................ 507/107, 126, 507/904, 207, 232, 922; 175/72

(56) References Cited

U.S. PATENT DOCUMENTS

| | | | |
|---|---|---|---|
| 2,748,057 A | * | 5/1956 | Goren ........................ 507/107 |
| 3,028,333 A | | 4/1962 | Stratton et al. |
| 3,070,165 A | | 12/1962 | Stratton |
| 3,089,842 A | | 5/1963 | Stratton |
| 3,089,846 A | | 5/1963 | Pitchford |
| 3,215,628 A | | 11/1965 | Peacock |
| 3,240,280 A | | 3/1966 | Stratton et al. |
| 3,264,214 A | | 8/1966 | Stratton |
| 4,385,999 A | | 5/1983 | McCrary |
| 4,420,405 A | | 12/1983 | McCrary |
| 4,514,308 A | | 4/1985 | Clampitt et al. |
| 4,645,609 A | | 2/1987 | Patel |
| 5,030,365 A | | 7/1991 | Christensen et al. |
| 5,229,441 A | | 7/1993 | Romagosa et al. |
| 5,378,272 A | | 1/1995 | Romagosa et al. |
| RE35,163 E | | 2/1996 | Christensen et al. |
| 5,502,030 A | * | 3/1996 | Patel .......................... 507/126 |

* cited by examiner

Primary Examiner—Philip Tucker
(74) Attorney, Agent, or Firm—Fellers, Snider, Blankenship, Bailey & Tippens, P.C.

(57) ABSTRACT

Sulfonated uintaite is prepared by sulfonating a naturally occurring uintaite charge with a sulfonating agent such as sulfur trioxide, fuming sulfuric acid, chlorosulfonic acid, oleum, or concentrated sulfuric acid to produce sulfonic acids of uintaite. The resulting sulfonic acids are neutralized with a caustic neutralizing agent and sulfonated uintaite is the product. The sulfonated uintaite product is dried and packaged. The produced sulfonated uintaite is useful in oil and gas well working fluids (drilling muds). Neutralization of the resulting sulfonic acids with sodium hydroxide or ammonium hydroxide as the caustic neutralizing agent yields water and oil-soluble or dispersible salts of the sulfonated uintaite. Neutralization with $Ca(OH)_2$ (calcium hydroxide) as the caustic neutralizing agent yields a product which is preferable in oil-based muds.

34 Claims, No Drawings

PROCESS FOR MAKING SULFONATED UINTAITE AND WELL FLUID ADDITIVES INCLUDING SULFONATED UINTAITE

FIELD OF THE INVENTION

This invention relates to the production of drilling fluids for oil and gas exploration and production operations. Specifically, the present invention relates to the sulfonation of uintaite and the application of sulfonated uintaite to oil and gas well drilling fluids, oil and gas well completion fluids, and fluid loss control of hydraulic fracturing fluids for oil and gas wells.

BACKGROUND OF THE INVENTION

It is well known that in penetrating the earthen formations to tap subterranean deposits, such as gas or oil, that penetration is accomplished by well drilling tools and a drilling fluid. Drilling fluid, also commonly known as drilling mud, serves to cool and lubricate the drill bits, to carry the cuttings to the surface as the drilling fluid is circulated in and out of the well, to support at least part of the weight of the drill pipe and drill bit, to provide a hydrostatic pressure head to prevent caving of the walls of the well bore, to deposit on the surface of the well bore a filter cake which acts as a thin, semi-impervious layer to prevent undue passage therethrough of drilling fluids, and to perform other functions as are well known in the drilling art. These fluids must be capable of exhibiting some rather sophisticated performance characteristics such as inhibiting the disintegration of drill cuttings, protecting and/or stopping the sloughing of unstable hard and brittle shales, have lubricating characteristics, reducing fluid loss, and particularly reducing high temperature fluid losses of drilling fluids, and reducing the fluid losses and spurt losses of hydraulic fracturing fluids during the hydraulic fracturing process. Furthermore, the prepared fluids must exhibit a viscosity in both brine waters and fresh waters and in selected oils sufficiently low to allow pumping.

It is also important that the drilling fluid exhibit a relatively low rate of filtration or fluid loss. That is, the drilling fluid should permit little, if any, loss of its liquid phase to the formation penetrated, as is well known to those skilled in the art. Most drilling fluids contain additives and conditioning agents which are important in determining the fluid loss properties of the drilling fluid, as well as inhibiting shale and clay disintegration.

In addition to exhibiting a low rate of fluid loss, it is desirable for the fluid to have certain rheological properties, such as low viscosity and gel strength.

One material known to be effective in drilling fluid is sulfonated asphalt. Sulfonated asphalt marketed under the trademark "Soltex®" by Phillips Petroleum Company has been used as a drilling fluid for many years. Six patents assigned to Phillips Petroleum Company relating to the production of sulfonated asphalt are: Stratton, et al., U.S. Pat. No. 3,028,333; Stratton, et al., U.S. Pat. No. 3,089,842; Pitchford, et al., U.S. Pat. No. 3,089,846; Peacock, et al., U.S. Pat. No. 3,215,628; and, Clampitt, et al., U.S. Pat. No. 4,514,308, incorporated herein by reference. Although sulfonated asphalt has many desirable properties, there still remains a need for a more effective product.

Known problems exist when sulfonating asphalt in the process of production of drilling fluids. A main problem resides with the characteristics of asphalt itself. The softening point of typical conventional refinery asphalts is approximately 130° to 155° F. In the production of sulfonated asphalt, the drying temperature is higher, 190° to 400° F., thus causing the non-sulfonated asphalt to be very sticky in the production equipment. In order to avoid this, the drying time must be extended at lower temperatures, resulting in a slow rate of drying. Longer drying times mean lower throughput in the manufacturing process. Moreover, the minimum level of sulfonation of the asphalt is dictated by properties required for smooth mechanical operations during the drying process If the level of sulfonation is too low, the product remains "gummy" and sticks to metal surfaces in rotary type dryers at the above temperatures to an extent that makes the process mechanically unworkable. When mechanical rotary dryers are used, the production rate is very much limited to low levels of sulfonation when using asphalts from conventional rude oil type refineries. Also, asphalt must be transported in heated trucks causing difficult handling, storage and heat maintenance problems. A need, therefore, exists for a material which can be efficiently produced at advantageous levels of sulfonation also manufactured without sticking to the production equipment and transported without heating.

Uintaite is a naturally occurring hydrocarbon mineral that was discovered in the early 1860's in the Uintah Basin in northeastern Utah. It occurs in vertical veins outcropping on the surface and extends downward hundreds of feet. The vertical veins are usually two to six feet wide, and veins as wide as 13 to 20 feet have been discovered and mined. The veins are nearly parallel to each other and are oriented in a northwest to southeast direction. They extend many miles in length and are as deep as 1500 to 2000 feet. Uintaite is mined with modern equipment such as with pneumatic chipping hammers and with mechanical and air hoists. Samuel H. Gibson began to promote the use of uintaite in the mid-1880s as a waterproof coating material for wooden pilings, and as insulation for wire cable and as a unique varnish.

Uintaite is a natural product whose chemical and physical properties vary and depend strongly on the uintaite source. Although uintaite is sometimes loosely described as an asphaltic material, its composition varies greatly from asphalt derived from refining operations. Uintaite is known to have the following characteristics: (1) high asphaltene content; (2) high solubility in organic solvents; (3) high purity and consistent properties; (4) high molecular weight; and, (5) high nitrogen content. One typical general analysis of uintaite shows the following weight percentages: Carbon 84.9%, Hydrogen 10.0%, Nitrogen 3.3%, Sulfur 0.3%, Oxygen 1.4%, Trace Elements 0.1%. Uintaite has a molecular weight of about 3000 which is considered very high compared to asphalt products from conventional crude oil refineries.

Uintaite is also commonly called "gilsonite" although this term is believed to be a registered trademark of American Gilsonite Company, Salt Lake City, Utah (Reg. No. 0144, 545). Three different companies in the US mine and sell today the naturally occurring mineral uintaite in the form of several softening point ranges. Upon information and belief, all three companies advertise their products as Gilsonite. These three companies are American Gilsonite Company with a corporate address of 109 Stevenson Street, Third Floor; San Francisco, Calif. 94105; LEXCO, INC.; P.O. Box 1198 of Vernal, Utah 84078; and the Ziegler Chemical and Mineral Corporation of 600 Prospect Avenue, Piscataway, N.J. 08854.

Typical uintaite used in drilling fluids is mined from an area around Bonanza, Utah and has a specific gravity of 1.05 with a softening point ranging from 325 deg. F to as high as 400+ deg. F. The lowest softening point material is used less frequently in drilling fluids. Uintaite has a low acid value, a zero iodine number, and is soluble or partially soluble in aromatic and aliphatic hydrocarbons, respectively. It is generally processed and ground to where 99% passes through a 65-mesh Tyler screen with approximately 3% being retained on a 100-mesh screen and 16% on a 200-mesh screen, non-cumulative. Uintaite is very friable so size reduction is easy with minimum equipment required.

American Gilsonite Company sells a variety of Gilsonite resins, sometimes identified by their softening points (Ring and Ball, an ASTM Method). For example, general purpose (GP) uintaite brand resin has a softening point of about 350 deg. F, and uintaite HM has a softening point of about 380 deg. F, and uintaite Select 300 and Select 325 which have softening points of 300 and 325 deg. F, respectively. The softening points of these naturally derived uintaites depend primarily on the source vein that is being mined when the mineral is produced.

Uintaite products are approved by the U.S. Food and Drug Administration for use in resinous and polymeric coatings that come into direct contact with food. Gilsonite falls under § 175.300 of the U.S. Food and Drug Administration regulations, Part 3, Subpart (IV), which lists Gilsonite as one of several approved natural resins. Gilsonite in its unaltered state is reported to be non-carcinogenic, non-mutagenic, and non-toxic by recognized test procedures.

Uintaite is described in the *Kirk-Othmer Encyclopedia of Chemical Technology*, 3rd Ed. Vol. 11, 1986, pp. 802–806; which is incorporated herein by reference. Gilsonite is described in *Hawley's Condensed Chemical Dictionary*, Thirteenth Edition, Copyright 1997 by John Wiley & Sons, Inc., p. 537, also incorporated herein by reference.

Uintaite is known to have use in both water-based and oil-based drilling fluids as additives assisting in borehole drilling, and has been believed to reduce the problems found in drilling through troublesome shales. Borehole instability problems are often referred to as sloughing, heaving, spalling or overpressured shales. Some shales hydrate and swell. Others are very hard, brittle, and are fractured.

However, known problems encountered with the use of uintaite as a drilling fluid are that it does not water wet with most surfactants and cannot be dispersed in water. Thus, stable dispersions of uintaite are often difficult to achieve, particularly in the presence of salts, calcium, solids and other drilling fluid contaminants and/or in the presence of diesel oil.

Uintaite has been treated with certain surfactants to give some water dispersability. Some of these surfactants are themselves very detrimental to drilling mud properties. However, it has been reported that these additives can help minimize hole collapse in geological formations containing water-sensitive, sloughing shales.

The surfactant-coated uintaite powders lose their water-wet characteristics over time and after several circulations in the drilling fluid system. This causes agglomeration and stickiness of the uintaite particles which are then removed by screening thereby eliminating their usefulness in the drilling fluid. Also, the surfactant coating on the uintaite could evaporate or be removed by washing with other additives leaving an undesirable oil-wet uintaite.

Previous attempts have been made to sulfonate uintaite. One such effort is described in U.S. Pat. No. 4,420,405 wherein uintaite is treated with sodium sulfite ($Na_2SO_3$) and sodium hydroxide (NaOH) in a mixture with lignite. However, the resultant product did not exhibit the desired water solubility properties of the uintaite portion described above. A need, therefore, exists for a uintaite material that is substantially soluble in water and exhibits some water wet characteristics.

SUMMARY OF THE INVENTION

This invention relates to the production of sulfonated uintaite and to well working fluids containing sulfonated uintaite. Sulfonated uintaite is produced, generally, by a controlled sequence of chemical reactions of uintaite, sulfur trioxide, and caustic in either a batch or continuous operation. The product of these reactions is dried, ground and packaged.

More specifically, the process for producing a sulfonated uintaite product according to the present invention is performed according to the following steps:

(a) adding a normally liquid, inert, low boiling point diluent to a charge of uintaite with mixing and agitation to form a mixture of uintaite material and diluent;

(b) contacting the thus formed uintaite/diluent mixture with a liquid or gaseous sulfonating agent under sulfonation conditions to produce sulfonic acids of uintaite;

(c) neutralizing the thus produced sulfonic acids of uintaite with a caustic neutralizing agent under neutralizing conditions to produce sulfonated uintaite;

(d) separating the diluent from the thus produced sulfonated uintaite by evaporation through the use of a heated dryer;

(e) recovering the thus evaporated diluent; and (f) drying the thus separated sulfonated uintaite as a product of the process.

The product of this process is a sulfonated uintaite which is useful for oil and gas well drilling fluids, oil and gas well completion fluids, and the fluid loss control of hydraulic fracturing fluids for oil and gas wells. This product may also be mixed with known drilling fluids, such as sulfonated asphalt to provide additional benefits. This process may include another embodiment to sulfonate asphalt with added uintaite resulting in a mixture of sulfonated asphalt/sulfonated uintaite. One benefit of adding uintaite during sulfonation is an increase in softening point and thereby faster drying times. A related benefit being the ability to produce sulfonated asphalt at lower levels of sulfonation without the product sticking to the production equipment.

The basic process described above may further include the steps wherein the separated diluent is in a vapor phase while a refrigerant is subjected to alternate compression and expansion in a closed cycle refrigeration system and essentially all of the diluent is further purified and condensed for reuse by passage in indirect heat exchange with the refrigerant.

One object of the present invention is to produce a sulfonated uintaite.

Another object of the invention thus being to provide a method of making uintaite water soluble without adding special surfactants.

A further object of the present invention is to produce the water soluble uintaite material through sulfonation.

Additional objects of the present invention include the preparation of a novel composition of matter having particular utility as a drilling fluid additive and its method of preparation.

A still further object of the present invention is to produce a sulfonated uintaite drilling fluid additive that is highly effective in high salt containing drilling fluid systems, and particularly at elevated downhole temperatures to 300° F., or higher.

In accordance with this invention, it is an object to provide a drilling fluid in which sulfonated uintaite provides unexpected improvements in water loss control over other sulfonated products.

Further, an object is to provide a method for dispersing or dissolving uintaite into drilling muds to provide wellbore stability characteristics.

The process of the present invention is capable of producing uintaite at many different levels of sulfonation. In other aspects of the invention, the process provides a method of customizing sulfonated uintaite for use in a wide range of well working fluids including water-based, oil-based, and emulsion types. The process may include in a second embodiment the addition of uintaite to asphalt and sulfonating the mixture. The present invention contemplates these objects as well.

Sulfonated uintaite produced from the present invention may be used in a method of drilling boreholes with drilling fluids wherein the drilling fluid is characterized by desirably low fluid loss in the presence of metal ions and possessing desirable Theological properties.

A better understanding of the invention and its objects and advantages as well as further objects will become apparent to those skilled in this at from the following detailed description, where is described only the preferred embodiment of the invention, simply by way of illustration of the best mode contemplated for carrying out the process of the invention. As will be realized, the invention is capable of modifications in various obvious respects all without departing from the scope of the invention. Accordingly, the detailed description should be regarded as illustrative in nature and not as restrictive.

DETAILED DESCRIPTION OF THE PREFERRED EMBODIMENT

Preparation of sulfonated uintaite can be carried out using a number of different reactants according to this process. In the preferred embodiment of the invention, sulfonated uintaite is prepared by sulfonating uintaite with a sulfonating agent such as liquid sulfur trioxide, neutralizing the resulting sulfonic acids with a caustic neutralizing agent, and recovering sulfonated uintaite as a product of this process. Suitable sulfonating agents include sulfur trioxide, finning sulfuric acid, chlorosulfonic acid, oleum, and concentrated sulfuric acid. Neutralization of said sulfonic acids with sodium hydroxide or ammonium hydroxide yields water and oil-soluble or dispersible salts of the sulfonated uintaite. Neutralization with $Ca(OH)_2$ (calcium hydroxide) yields a product which is preferable in oil-based muds.

The uintaite can be slurried or dissolved in a suitable diluent (or solvent) such as hexane, heptane, gasoline, kerosene, or the like, prior to reaction with the sulfonating agent. The preferred diluent is an inert, low boiling point liquid. The particularly suitable diluent for this process is n-hexane. It is known that uintaite has limited solubility in hexane. Due to this partial solubility, the term "diluent" is used throughout rather than "solvent", however, it is understood that the uintaite may be insoluble, partially soluble, or completely soluble in the diluent. Diluent can be added to the blend at any time during the manufacturing process. The diluent can be separated from the neutralized product by distillation or simple heating during the drying step.

Sulfonated uintaite can be prepared using the above-described process as follows:

a.) A charge of dry, naturally occurring uintaite, is obtained. A colloid mill or other such shearing device may be used to reduce particle size.

b.) The uintaite charge is next augured into a stream of hexane diluent. The mixture includes a 15 to 55% by weight mixture uintaite having a ring and ball softening point in the range of about 300 to 400+ degrees F. with the hexane diluent comprising the balance of the mixture. The mixture is stirred and circulated at room temperature to a maximum of approximately 110° F. while low pressure is maintained (to prevent the diluent from volatilizing). The ratios of uintaite and diluent are further set forth in Table I, below.

c.) In a closed, agitated, and stirred vessel, liquid (or gaseous) sulfur trioxide ($SO_3$) is added at a concentration of approximately 23 to 65% by weight of the uintaite to form a reaction product of uintaite. The $SO_3$ is added slowly over approximately 1–3 hours. The significant heat generated by the sulfonation reaction is moderated using heat exchange to maintain a controlled temperature.

d.) Following sulfonation, the reaction product is neutralized with caustic neutralizing agent sodium hydroxide, an alkali metal salt compound, to obtain a pH level between approximately 7 and 9.5 to produce neutralized sulfonated uintaite.

e.) Following neutralization of the sulfonated uintaite, the hexane diluent is removed and the product can be dried. Differing means for drying include conventional rotary dryers, oven dryers, drum dryers, or even with steam stripping followed by drum drying. Due to the high softening point characteristics of the uintaite, drying temperatures can range from 190 to 450 degrees F.

The gaseous by-products of the reaction process are discarded or scrubbed in a known manner. The separated diluent is recycled in a known manner.

The following example describes the sulfonation of the inventive sulfonated uintaite drilling fluid additive by using uintaite as mined. A representative preparation is described below.

EXAMPLE I

Sulfonation

TABLE I

Sulfonation Reactions

| Prep No. | GMs $SO_3$ Added | Time Required to add $SO_3$ (min.) | Final pH | Product Solubility Wt. % |
|---|---|---|---|---|
| 150 gm. Ziegler ZECO 110 | | | | |
| 66 | 98 | 128 | 9.4 | 60.5 |
| 65 | 75 | 100 | 9.5 | 49 |
| 68 | 61.5 | 56 | 9.3 | 44 |
| 69 | 48 | 40 | 9.4 | 40 |
| 70 | 34.6 | 26 | 9.6 | 31 |
| 150 gm Ziegler DMA 400+ F. | | | | |
| 64 | 98 | 131 | 9.6 | 65.5 |
| 67 | 75 | 76 | 9.5 | 55 |

In Preparations Nos. 64 to 70, a charge of 150 grams of pulverized uintaite was blended with 530 ml n-hexane.

Some portion of the uintaite may not dissolve but will settle as fine particles which do not agglomerate even after standing overnight. After standing overnight the uintaite-hexane mixture is added to a stirred glass reactor along with an additional 270 ml n-hexane to give a total of 800 ml hexane.

Stabilized sulfur trioxide is added slowly from a dropping burette. An air-driven motor is used for constant stirring and agitation of the mixture once the $SO_3$ addition begins. The temperature is controlled by limiting the rate of $SO_3$ addition. On average, the temperature is about 32° C., but may reach 40° C. or higher. Once the $SO_3$ addition is complete, stirring is continued for an additional two hours.

A fifty-percent aqueous solution of NaOH is added to give a one-percent aqueous solution a pH of about 9.5. The final pH is measured after the product is dried. A mixture of 2 g of product in 200 ml water is stirred for two minutes with a blender to determine the pH.

Once sulfonation and neutralization are complete, the hexane is removed easily by evaporation, leaving a product that crumbles, making further air drying easily accomplished. There is no tendency for the sulfonated uintaite to stick to surfaces.

A special particle size reducing device is preferably employed for blending the uintaite-hexane mixture in a commercial plant prior to sulfonation since there may be a substantial amount of particulate uintaite that is not sulfonated in laboratory experiments due to diffusion limitations.

In a number of preparations the amount of $SO_3$ added per 150 g of uintaite ranged from 34.6 to 98 grams. The solubility of the final products ranged from 60.5 percent for Prep No. 66 to 31 percent for Prep No. 70. The physical nature of the sulfonated uintaite mixture in hexane was essentially unchanged by the variation in the amount of $SO_3$ added. There was some variation in the amount of particulate matter following neutralization, but the ease of drying was unchanged.

Uintaite is distinctly different from asphalt in its handling characteristics during the sulfonation process. Uintaite has little or no tendency to become tacky and sticky when blended with hexane, whereas some asphalts may be very tacky and hard to disperse. The sulfonated uintaite product did not stick to the production equipment surfaces even in the product with the least sulfonation. Asphalt has to be sulfonated to a level high enough to prevent sticking during the drying process. Also, asphalt has to be delivered in molten form in heated tanks whereas uintaite is handled as a dry product at room temperature.

The degree of sulfonation of uintaite in the present process may vary depending upon the desired product application. For use in well working fluids, the degree of sulfonation can range between 125 grams of $SO_3$ and 30 grams of $SO_3$ per 150 grams of uintaite. However, the preferred range is between 80 grams of $SO_3$ and 50 grams of $SO_3$ per 150 grams of uintaite.

Water solubility and dispersibility of the uintaite are important product characteristics. In tests, the water solubility was measured with a Soxhlet extraction apparatus where hot condensed water is dropped into a Whatman cellulose extraction thimble containing the product to be tested. Before starting the solubility tests, the cellulose thimble and a cotton ball are dried several hours at 80° C. Two grams of the dried sample are added to the thimble and the thimble is stoppered with a dry cotton ball. Total weight of the thimble, sample and cotton ball are recorded. The water solubility test is initiated by boiling water to vapor above the thimble where the water is cooled to condense, and it then falls a drop at a time down into the thimble dissolving the product sample. The solubility test usually lasts 24 hours. The extraction process is allowed to continue until the water effluent becomes clear. The thimble containing the extracted sample is dried at 80 deg. C to a constant weight which is recorded. The water solubility of the sulfonated uintaite produced from the present process typically ranges between 70% and 25%, with a preferred range of between 55% and 35%.

While the diluent normally should be one that does not react significantly with $SO_3$, there could be some exceptions. Because of its aromatic content, diesel oil could be a diluent for uintaite. A very significant increase in viscosity was noted when ZECO 110 a commercially available uintaite with softening point of 300 to 325° F., was added to diesel oil. The addition of $SO_3$ to the diesel oil mixture created a grease-like product. While this product was only partially dispersible in mud, it was an effective drilling fluid product.

A minor amount of diesel oil in diluent such as hexane is also a contemplated combination. The hexane is driven off leaving the product in an oil. Products slurried in oil are sometimes preferred over dry products, particularly for oil-based drilling fluids. The aromatic content of the diesel oil would be sulfonated, leaving a product that would be acceptable for use in drilling muds.

It has been found that improved well working fluids can be provided comprising a fluid medium and a small but sufficient amount of a sulfonated uintaite to improve the physical properties of the well working fluid. A product produced by the present process can be used in well working fluids for decreasing shale sloughing and borehole instability.

Sulfonated uintaite can be added into a water or oil based drilling fluid in an amount preferably between 1 and 7 pounds per barrel of drilling fluid.

The process of the invention contemplates water and oil dispersible ammonium or alkaline metal salts of sulfonated uintaite. Additionally, alkaline earth metal salts may be useful especially in oil-based muds.

Sulfonated uintaite process according to the present invention may be used as a fluid loss additive for hydraulic fracturing of oil and gas wells. For this purpose, it has been found that a useful concentration will preferably be in the range of 10 to 100 pounds of sulfonated asphalt per thousand gallons of fracturing fluids. These fracturing fluids may be either water base or oil base.

EXAMPLE II

Performance of Sulfonated Uintaite in a Saltwater Mud

A base mud was prepared in four percent (4%) NaCl water. Clay (bentonite) was added while stirring with a Gifford Wood mixer, and stirring was continued for 40 minutes. After standing overnight, Rev Dust (an illite type of clay) and barite were added and the mixture was again stirred for 40 minutes. In the final mud, bentonite constituted 2.7 wt. percent, Rev Dust 9.15 wt. percent, and barite 30 wt. percent.

The entire volume of mud was treated with 2 lb/bbl chrome-free Desco® thinner, 5 lb/bbl causticized lignite and 1 lb/bbl Driscal® D polymer with sufficient stirring to fully disperse the polymer. Desco® and Driscal® are available commercially from Phillips Petroleum Company.

The sulfonated products were tested at 7 lb/bbl. Six ml of 6N NaOH were added at the beginning of a 10-minute stirring period. Additional NaOH was added to give an initial pH of 10.2 to 10.4. Multimixers were used for stirring. The muds were aged in brass bombs 16 hours at 300° F.

After cooling, the muds were stirred 5 minutes, and the pH was adjusted to 8.7+/−0.2. Rheology was measured with a Fann Viscometer, Model 35A. API water loss tests were made at room temperature and at 300° F.

As shown in Table II, sulfonated uintaite is significantly more effective in reducing water loss at 300° F. than the sulfonated asphalt. A graph of water loss at 300° F. versus percent product solubility indicates optimum performance at about 49 percent solubility. Even at a solubility of only 31 percent, sulfonated uintaite is more effective as a high Pulverized ZECO 110 as received had no important effect on water loss either at room temperature or at 300° F. when compared to the base mud. This product, as-mined, is not effective in controlling fluid loss at temperatures observed in most oil and gas well drilling applications.

Uintaite treated with surfactants to make it dispersible increased water loss by 68 percent at room temperature and by 29 percent at 300° F. The surfactants also had detrimental effects on rheology which can be seen in the large increases in yield point value and 10-second gel strength.

TABLE II

Sulfonated Uintaite compared to Sulfonated Asphalt in Saltwater Muds

| Prep No. | Level of Sulfonation (gm SO$_3$/150 gms Uintaite) | Sample of Product % Solubility | Mud Properties* | | | | |
|---|---|---|---|---|---|---|---|
| | | | Pv/YP | Gels | pH | RTWL (75F) | HTWL (300F) |
| | Ziegler ZECO 110 Uintaite | | | | | | |
| 66 | 98 | 60.5 | 21/14 | 13/45 | 8.8 | 12.0 | 37.0 |
| 65 | 75 | 49 | 17/16 | 13/46 | 9/0 | 12.3 | 31.2 |
| 68 | 61.5 | 44 | 20/15 | 17/51 | 8.7 | 15.3 | 39.5 |
| 69 | 48 | 40 | 19/16 | 20/51 | 8.6 | 14.9 | 40.5 |
| 70 | 34.6 | 31 | 17/12 | 12/46 | 8.6 | 17.5 | 36.5 |
| | Ziegler DMA 400 + F Uintaite | | | | | | |
| 64 | 98 | 65.5 | 18/15 | 13/47 | 8.7 | 13.7 | 44.0 |
| 67 | 75 | 55 | 18/16 | 13/48 | 8.8 | 14.0 | 35.0 |
| | Soltex (BH 1297-10) Commercial Sulfonated Asphalt | | | | | | |
| — | — | 84 | 22/13 | 15/37 | 8.7 | 15.7 | 62.0 |
| | Soltex (Elk City) | | | | | | |
| — | — | 96.5 | 18/13 | 15/31 | 8.7 | 16.9 | 50.0 |
| | Base Mud (No Additive) | | | | | | |
| — | — | — | 18/14 | 16/57 | 8.6 | 23.1 | 70.5 |
| | Unreacted ZECO 100 (Not Sulfonated) | | | | | | |
| — | — | 0.4 | 21/12 | 15/56 | 8.6 | 24.7 | 68.0 |
| | Uintaite Treated with Surfactants | | | | | | |
| — | — | — | 20/60 | 60/53 | 8.6 | 38.9 | 91.0 |

PV Plastic Viscosity
RTWL API Water Loss at amb. temp., 100 psi, ml/30 min.
YP Yield Point, lb./100 sq. ft.
HTWL API High Temp-High Pressure Water Loss at 300 F, 500 psi, ml/30 min.
Gels Gel Strength, 10 sec/10 minutes, lb./100 sq. ft.

temperature fluid loss additive than the sulfonated asphalt at 84 percent solubility. This result is totally unexpected.

At room temperature, differences in water loss values in Example II were much less pronounced. Only sulfonated uintaite at a water solubility of 31 percent gave a higher water loss at room temperature than the sulfonated asphalt, and only by a small margin.

Solubility should be an important factor in the performance of these products. However, particulates which are not truly soluble but are very finely divided and dispersible in muds are very effective in controlling water loss.

This work was done with uintaite from Ziegler Chemical and Mineral Corp. ZECO 110 has a softening point range from 300° F. to 325° F. DMA has a softening point of 400° +F.

EXAMPLE III

Composition Differences Between Asphalt and Uintaite

Table III shows the fractionation ranges of both asphalt and uintaite into four classes of hydrocarbons: saturates (Sat), aromatics (Arm), resins (Res), and asphaltenes (Asp). The table presents the fractions as a percentage of the total hydrocarbon content of the samples.

The uintaite is a naturally occurring singular material whose consistent composition is never approached in the asphalt compositions. It lies at the extreme end of the total sample set, and it is unique.

Of the saturate, aromatic, resin, and asphaltene fractions in either asphalt or in uintaite, the sulfonation reaction tends to occur most easily with the aromatics fraction, and secondarily with the asphaltene fraction. The saturated and resin fractions are very resistant to sulfonation.

As is seen in the above discussion, and Table III, the uintaite is poor in aromatics and rich in asphaltenes in comparison with refinery asphalt (random samples of typical commercial asphalt). Consequently, when the sulfonations are carried out in these two materials, the sulfonated asphalt is going to contain relatively more sulfonated aromatics than does the sulfonated uintaite, and the characteristic properties of these two materials are going to reflect this difference. Moreover, because of its low aromatic and high asphaltene composition, the capability of uintaite to become sulfonated is not evident.

The sulfonated components in the uintaite are going to be higher molecular weight than the sulfonated components in the asphalt. This is going to make the material form a better, thinner, more water tight mud-cake. The sulfonated uintaite seals the formation more effectively than the sulfonated asphalt.

TABLE III

Analysis of Asphalt and Uintaite Samples
(% - Percentages by Weight)

| | Total Analysis | | | | | Non Resin Fractions | | | |
|---|---|---|---|---|---|---|---|---|---|
| | Sat | Arm | Res | Asp | Total | Sat | Arm | Asp | Total |
| LA Ref. | 14 | 46 | 32 | 8 | 100 | 20.6 | 67.6 | 11.8 | 100.0 |
| TX Ref. | 4 | 45 | 42 | 9 | 100 | 6.9 | 77.6 | 15.5 | 100.0 |
| TRUM | 18 | 39 | 30 | 13 | 100 | 25.7 | 55.7 | 18.6 | 100.0 |
| COMM 1 | 11 | 24 | 30 | 35 | 100 | 15.7 | 34.3 | 50.0 | 100.0 |
| COMM 2 | 8 | 30 | 31 | 31 | 100 | 11.6 | 43.5 | 44.9 | 100.0 |
| COMM 3 | 11 | 46 | 29 | 14 | 100 | 15.5 | 64.8 | 19.7 | 100.0 |
| Uintaite | 5.5 | 4.5 | 36.9 | 53.1 | 100 | 8.7 | 7.1 | 84.2 | 100.0 |

Based on the results from sulfonating the uintaite, some unique products may be made by sulfonating a blend of both uintaite and asphalt from a refinery. One very important improvement to the sulfonation process of refinery asphalts is the great improvement in ease of drying and the rate of drying when using a rotary type dryer when a significant amount of higher softening point uintaite is mixed with a low softening point liquid asphalt.

Accordingly, a second embodiment of the present invention includes a mixture of sulfonated asphalt from a conventional refinery and uintaite. In a preferred embodiment, 5 to 50% uintaite is added by weight to asphalt and the mixture is sulfonated according to the process of this invention. The addition of uintaite greatly improves the rate of drying of the sulfonated asphalt, especially in rotary type dryers and drum dryers. Significantly, according to this embodiment, an improved method of drying conventional sulfonated with reduced amounts of $SO_3$. Otherwise, as stated above, conventional asphalt must be sulfonated to an extent where it will dry.

In this embodiment, the process is the same, however, a mixture of uintaite and asphalt are sulfonated together in order to obtain a product with lower water solubility, and in order to dry at a more efficient and rapid rate in either single or double roll drum dryers, or in rotary dryers such as the Bepex Solidaire rotary dryer. According to this embodiment, the cost of drying sulfonated asphalt is reduced through the addition of a significant amount of uintaite in the sulfonation process.

EXAMPLE IV

Sulfonation and Oxidation

The effectiveness of sulfonated products with low solubility suggests the water-insoluble portion is also beneficial in controlling water loss.

Uintaite was reacted with 20 percent oleum (sulfuric acid containing additional dissolved $SO_3$) by the same procedure used for reaction with liquid $SO_3$. ("Prep 71" in Table IV.) The uintaite portion of Prep 71 was not water soluble. This was indicated by the fact that during the soxhlet extraction water solubility test at elevated temperatures, the water was not discolored.

Prep 71 was tested in mud at a concentration to give 7 lb/bbl. Prep 71 was somewhat effective in controlling water loss at an elevated temperature of 300 F.

Oleum is much less effective in sulfonation reactions than is $SO_3$. Oleum and $SO_3$ are strong oxidizers as well as sulfonating reagents.

TABLE IV

Oxidized Uintaite

| Prep No | PV/YP | Gels | pH | RTWL (75° F.) | HTWL (300° F.) |
|---|---|---|---|---|---|
| | Oleum Treated ZECO 110 | | | | |
| 71 | 18/13 | 16/51 | 8.6 | 18.5 | 43.5 |

(The mud used in these tests is the same as in Example II.)

EXAMPLE V

Clay-Shale Inhibition Tests

The ability of sulfonated uintaite to inhibit clay particles from dispersing is an important factor. Tests were conducted to measure and observe this effect. A base mud was prepared that contained two (2) weight percent untreated bentonite clay prehydrated in deionized water followed by the addition of 0.25 grams of sodium hydroxide. Then 0.5 grams of chrome free Desco® is added. Desco is available commercially from Phillips Petroleum Company. After mixing, the base mud was aged overnight at room temperature. The next day the mud was vigorously stirred before taking equal volume samples. To each base mud sample an equivalent amount of sulfonated uintaite, equal to 6 pounds per barrel, is stirred into the samples for 10 minutes. After mixing each sulfonated uintaite sample into this base mud, an addition of more bentonite clay is made to each sample. The additional bentonite was equivalent to 15 pounds per barrel. After stirring the samples an additional 10 minutes, a second additional amount of bentonite clay equal to 10 pounds per barrel was added to each sample. Thus a total of 25 pounds per barrel equivalent of bentonite was added with the final stirring time being 10 minutes. The samples were cooled to room temperature, stirred and tested for Theological properties using a Fann 35 viscometer at speeds of 3 to 600 RPM. Plastic Viscosity, Yield Point, Gel Strengths, and pH were measured for all samples.

Table V provides a comparison of the inhibition properties that develop when using sulfonated uintaite. Note the very significant reductions in Plastic Viscosity and Yield Points following addition of the sulfonated uintaite products from preparations shown in Table I. It is most important to conclude that sulfonated uintaite made by the process of this invention has the ability to inhibit the dispersion of clay particles as reflected by the lower PV and YP values. In the case of actually drilling Bentonitic shales, this data suggests the drilling fluid would experience lower viscosities due to thickening by having less particle dispersion of the drilled bentonite clays.

A duplicate sample of base mud was also run and it contained no sulfonated uintaite product. This affords a direct comparison with and without the sulfonated products. One can expect high viscosities of the drilling fluid when drilling bentonite clays.

TABLE V

Clay-Shale Inhibition Tests with Sulfonated Uintaite

| Uintaite Prep. No. | Fann 35 Readings at Various RPMS | | | | | | Gels | |
| --- | --- | --- | --- | --- | --- | --- | --- | --- |
| | 600 | 300 | 200 | 100 | 6 | 3 | 10'/10" | PV/YP |
| 65 | 70 | 50 | 43 | 34 | 21 | 21 | 23/57 | 20/30 |
| 66 | 69 | 51 | 44 | 36 | 24 | 24 | 30/54 | 18/33 |
| 69 | 73 | 54 | 47 | 38 | 26 | 26 | 30/56 | 19/35 |
| Base Mud (No Uintaite) | 110 | 82 | 70 | 55 | 31 | 31 | 31/69 | 28/54 |

While the invention has been described with a certain degree of particularity, it is manifest that many changes may be made in the details of construction without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. A process for producing a sulfonated product, comprising:
   (a) adding a diluent to a charge of asphalt and uintaite to form a mixture;
   (b) contacting said mixture with a sulfonating agent to produce a reaction product;
   (c) neutralizing said reaction product with a caustic neutralizing agent to produce a neutralized sulfonated asphalt/uintaite mixture;
   (d) separating at least part of said diluent from said neutralized sulfonated asphalt/uintaite mixture; and
   (e) drying said separated sulfonated asphalt/uintaite mixture as a product of the process.

2. The process of claim 1 where uintaite is added to asphalt in a concentration range of between 5% and 50% by weight uintaite.

3. A sulfonated asphalt/uintaite product prepared according the process of claim 1.

4. An oil and gas well working fluid comprising a fluid medium containing a sulfonated asphalt/uintaite made according to the process of claim 1.

5. A process for producing sulfonated uintaite comprising:
   (a) reacting a charge of uintaite with a sulfonating agent selected from the group consisting of sulfur trioxide, fuming sulfuric acid, chlorosulfonic acid, oleum and concentrated sulfuric acid to produce sulfonic acids of uintaite;
   (b) neutralizing said sulfonic acids of uintaite with a caustic neutralizing agent; and thereafter
   (c) drying the resulting neutralized sulfonic acids of uintaite.

6. The process of claim 5 wherein said sulfonating agent is sulfur trioxide and said caustic neutralizing agent is sodium hydroxide.

7. The process of claim 5 wherein said sulfonating agent is oleum and said caustic neutralizing agent is sodium hydroxide.

8. A neutralized sulfonic acid of uintaite prepared by the process of claim 5.

9. An oil and gas well working fluid comprising a fluid medium and a neutralized sulfonic acid of uintaite wherein said neutralized sulfonic acid of uintaite is prepared in accordance with the process of claim 5.

10. The process of claim 5 for the production of a neutralized sulfonic acid of uintaite which is carried out in the absence of surfactants.

11. An oil and gas well working fluid in accordance with claim 9 wherein said fluid contains an amount of said neutralized sulfonic acid of uintaite in an amount in the range of from about 1 to about 7 pounds per barrel of said fluid medium.

12. An oil and gas well working fluid in accordance with claim 11 wherein said fluid medium is a water-based drilling fluid.

13. An oil and gas well working fluid in accordance with claim 11 wherein said fluid medium is an oil-based drilling fluid.

14. The process of claim 5 wherein said sulfonating agent is added in an amount in the range from about 30 to about 125 grams per 150 grams of uintaite.

15. A process for the production of neutralized sulfonic acids of uintaite comprising:
   (a) adding a liquid diluent to a charge of uintaite to form a mixture;
   (b) contacting mixture with a sulfonating agent selected from the group consisting of sulfur trioxide, fuming sulfuric acid, chlorosulfonic acid, oleum and concentrated sulfuric acid to produce a sulfonic acids reaction product of uintaite;
   (c) neutralizing the sulfonic acid reaction product of uintaite with a caustic neutralizing agent to produce a neutralized sulfonated uintaite;
   (d) separating at least part of said diluent from said neutralized sulfonated uintaite; and
   (e) drying the resulting neutralized sulfonated uintaite.

16. The process of claim 15 wherein said diluent is selected from the group consisting of hexane, heptane, gasoline, kerosene and diesel.

17. The process of claim 15 wherein said diluent is hexane.

18. A neutralized sulfonic acid of uintaite prepared by the process of claim 15.

19. An oil and gas well working fluid comprising a fluid medium and a neutralized sulfonic acid of uintaite which is prepared in accordance with the process of claim 15.

20. The process of claim 15 wherein said neutralizing agent is selected from the group consisting of sodium hydroxide, ammonium hydroxide and calcium hydroxide.

21. The process of claim 15 wherein said diluent is hexane, said sulfonating agent is sulfur trioxide and said caustic neutralizing agent is sodium hydroxide.

22. An oil and gas well working fluid in accordance with claim 19 wherein said fluid is a water-based drilling fluid.

23. An oil and gas well working fluid in accordance with claim 19 wherein said fluid is an oil-based drilling fluid.

24. An oil and gas well working fluid in accordance with claim 19 wherein there is additionally present clay.

25. An oil and gas well working fluid in accordance with claim 24 wherein said clay is bentonite.

26. A well working fluid comprising a fluid medium containing a mixture of sulfonated asphalt and sulfonated uintaite wherein the sulfonated uintaite is made according to the process of claim 15.

27. A well working fluid in accordance with claim 26 where the weight ratio of said sulfonated asphalt to said sulfonated uintaite is within a range of about 3:1 to about 0.5:1.

28. A well working fluid in accordance with claim 26 wherein the weight ratio of said sulfonated asphalt to said sulfonated uintaite is within the range of about 2.5:1 to about 1.5:1.

29. A well working fluid in accordance with claim 26 wherein said mixture of sulfonated asphalt and sulfonated uintaite is present in an amount within the range of about 0.1 to about 10 pounds per barrel of said well working fluid.

30. The process of claim 15 wherein the process is carried out in the absence of surfactant.

31. The process of claim 15 wherein there is carried out the further step of introducing the resulting sulfonated uintaite into oil based drilling fluid in an amount in the range of from about 1 to about 7 pounds per barrel of oil-based drilling fluid.

32. An oil and gas well working fluid comprising a fluid medium containing between about 1 to about 7 pounds of a sulfonated uintaite made in accordance with the process of claim 31.

33. A process in accordance with claim 15 wherein said separated diluent is recovered, condensed and purified.

34. A process in accordance with claim 33 wherein a portion of the diluent is separated from the sulfonated uintaite in the separation step in a liquid phase and a portion is separated in a vapor phase;

withdrawing said liquid phase portion of said diluent for reuse in the process;

combining at least part of said vapor phase of said diluent with the separated diluent of step (d) to form a composite and thereafter purifying said composite.

* * * * *